United States Patent Office 3,270,033
Patented August 30, 1966

3,270,033
N-OLEOYLPYRROLIDINE
Evald L. Skau, Robert R. Mod and Frank C. Magne, all of New Orleans, La., assignors to the United States of America as represented by the Secretary of Agriculture
No Drawing. Application Apr. 2, 1964, Ser. No. 361,925, which is a division of application Ser. No. 260,923, Feb. 25, 1963, now Patent No. 3,219,612, dated Nov. 23, 1965. Divided and this application Sept. 10, 1965, Ser. No. 509,448
1 Claim. (Cl. 260—326.5)

A non-exclusive, irrevocable, royalty-free license in the invention herein described, throughout the world for all purposes of the United States Government, with the power to grant sublicenses for such purposes, is hereby granted to the Government of the United States of America.

This application is a division of Serial No. 361,925, filed April 2, 1964, which is a division of Serial No. 260,923, filed February 25, 1963, now United States Patent No. 3,219,612.

This invention relates to certain compounds which are N-acyl derivatives of cyclic imines, to some unique mixtures of N-acyl derivatives of cyclic imines, and to plastic compositions, the plasticizer component of which is at least one of the compounds or one of the unique mixtures that are the subject of this invention. More particularly, this invention relates to N,N-disubstituted long chain aliphatic amides the acyl component of which if saturated is an alkanoic acyl containing from 10 to 18 carbon atoms, and if unsaturated is an alkenoic acyl containing from 18 to 22 carbon atoms, the amide nitrogen in all cases being a member of a heterocyclic ring, all of the other ring members being carbon or nitrogen atoms.

This invention, in addition, relates to certain other new amide plasticizers wherein the acyl component is derived from dibasic alkanoic acids, from epoxodized alkanoic acids and from dimer acids.

This invention also relates to certain mixtures of the above-mentioned amides which individually or in combination with other mixtures of amides are compatible plasticizers for vinyl chloride resins.

We have discovered that the compounds and the mixtures of compounds that are the subject of this invention are good, compatible, solvent-type plasticizers for vinyl chloride resins. Moreover, the compounds and mixtures of compounds that are the subject of this invention are efficient primary solvent-type plasticizers which can be made from low price fatty acids and which exhibit good compatibility with and impart low volatility loss, resistance to microbial action, excellent low temperature properties, and stability to northern light exposure to polymer and copolymer resins of vinyl chloride.

The terms "vinyl type resin" and "vinyl chloride resin" are used throughout this specification and claims to refer to polymers and copolymers of monomers containing vinyl chloride in a predominant proportion by weight. Terms such as "compatible," "good compatibility," and "compatible plasticizer" in reference to the plasticizers which are the subject of this invention are used throughout the specification to refer to plasticizers that show no sign of exudation, migration to the surface, for at least two weeks when the plasticizers are present in the resin in proportions of about 70 parts by weight of plasticizer to 100 parts by weight of resin.

Not only are the compounds that are the subject of this invention useful as plasticizers for vinyl chloride resins, but they are also efficient, compatible softners for Buna N rubber, imparting low volatility loss and excellent low temperature properties to the plasticized rubber compositions.

If a resin is plasticized with a compound with which it has only limited compatibility, the plasticizer soon exudes or migrates to the surface unless the plasticizer is used either in a limited amount or is used in conjunction with a mutual solvet (a compatible auxiliary plasticizer) to obtain adequate compatibility.

It is known in the art that compounds similar to those which are the subject of this invention exhibit reasonably good compatibility of hydrophylic type resins but in order to obtain adequate flexibility must be employed together with a secondary or an auxiliary plasticizer as see for example United States Patent Number 2,339,056.

It would be expected from the recognized campatibility of compounds related to the type herein described with polyvinyl acetals (hydrophylic type resins), that these compounds would be quite incompatible with polymers of the vinyl chloride type. We have discovered, however, that not only are the particular compounds and compound mixtures herein described compatible as primary plasticizers with vinyl chloride resins but as we note above they are compatible with the hydrophylic type resins as well.

Not only are the particular compounds and mixtures of compounds herein described compatible vinyl type resin plasticizers, but the instant invention is considerably broader in that it also contemplates the use of the compatible (compatible with respect to the particular resin involved) binary, ternary, or multiple component mixtures of N-acyl cyclic imines of saturated, monounsaturated, and polyunsaturated acids such as can be derived from animal, fish, or vegetable fats and oils such as tallows, white greases menhaden oil, cottonseed oil, soybean oil, rapeseed oil, *Crambe abyssinica* seed oil, jojoba oil, parsley seed oil, *Limnanthes douglasii* seed oil, palm oil, *Vernonia anthelmintica* seed oil, castor oil, foots, or from tall oil acids or rosin acids, and other seed oils.

The N-acyl derivatives of this invention decrease in their degree of compatibility as the alkyl portion of the acyl group (if saturated) increases in chain length beyond 15 carbon atoms and they are incompatible when the chain length is 17 or more carbon atoms. In general, the compatibility of a mixture of N-acyl cyclic imines containing a considerable portion of these less compatible or incompatible N-acyl cyclic imines can be improved by mixing with a compatible plasticizer or by reducing the portion of the incompatible saturated constituent by such procedures as fractional distillation or fractional crystallization either before or after the amidation step in the preparation of the N-acyl cyclic imine mixture. Similarly, the N-acyl derivatives of this invention decrease in their degree of compatibility as the alkyl portion of the acyl group of the N-acyl derivative (if unsaturated) increases in unsaturation beyond monounsaturation. In general, the compatibility of such a polyunsaturated derivative or of a mixture of N-acyl cyclic imines containing such a polyunsaturated acyl can be increased by mixing with a suitable amount of a compatible plasticizer or by decreasing the polyunsaturation of some or all of the polyunsaturated constituents either by physical means, such as fractionation, or by chemical means such as selective hydrogenation, cyanoethylation, halogenation, epoxidation, formylation, maleination, dimerization, cyclization, or the like either before or after the amidation step in the preparation of the N-acyl imine or N-mixed acyl cyclic imine. The specific component ratio of compatible compositions can be established according to the scheme set forth in our copending application Serial No. 166,742, filed January 15, 1962, now U.S. Patent No. 3,219,664, granted November 23, 1965, for example.

Also included among the operable N-acyl acyclic imines are those whose acyls are the acyls of the following groups of acids: alkanoic acids with substituents in the chain such as dichloro stearic acid; acyloxyacids such as 12-acetoxyoleic, 12-acetoxystearic and 9,10-diacetoxystearic acids and the like; 12-beta-cyanoethoxyoleic and 12-cyanoethoxystearic acids and the like; ricineoleic acid; phenylstearic acid; phenoxyacetic acid; mono-, di-, or triepoxy stearic acids; mono- or diepoxy oleic acid; epoxydocosanoic acid; dimerized or trimerized linolenic, linoleic or oleic acid, etc.; cyclic acids such as cyclized linoleic and/or linolenic acids; Diels-Alder adducts of such polyenoic acids as tung oil acids or soybean acids, the Diels-Alder adducts of tung oil acids with di-alkyl maleates, alkyl acrylates, acrylonitrile, fumaronitrile and the like; tall oil acids; and rosin or terpene-derived acids such as abietic, l-pimaric, pinonic, pinic and the gamma-lactone of beta-hydroxyisopropyl pimelic acid; as well as the mono-alkyl esters of dibasic acids such as pinic, adipic, sebacic, brassylic, carboxystearic, phthalic, terephthalic and dialkyl phosphono stearic acids, and the like.

Terms such as "dimer acid," or "dimerized acids" are used indiscriminately to refer to acids or mixtures of acids consisting essentially of dibasic acids continuing from 32 to 44 carbon atoms resulting from the polymerization or dimerization of long chain $C_{16}$ to $C_{22}$ unsaturated fatty acids. Terms such as "trimer acids," or "trimerized acids" are used indiscriminately to refer to acids or mixtures of acids consisting essentially of tribasic acids containing from 48 to 66 carbon atoms resulting from the polymerization or trimerization of long chain $C_{16}$ to $C_{22}$ unsaturated fatty acids.

The compounds of the instant invention were tested for vinyl chloride-vinyl acetate (95–5) copolymer resin Vinylite (VYDR) and in polyvinylchloride (Geon 101) in a standard formulation comprising: 63.5% of Vinylite VYDR or Geon 101, 35% plasticizer, 0.5% stearic acid, and 1.0% basic lead carbonate. This formulation for each sample was milled, molded, and tested. In all examples, the sample was rated as incompatible if the molded stock showed any evidence of exudation or migration to the surface during a shelf storage of two weeks.

The compounds that are the subject of this invention are conveniently prepared by reacting the appropriate imine, which in every case is a cyclic imine wherein the nitrogen atom is a member of the ring, with the appropriate acid or corresponding acid chloride. In any event, methods for preparing compounds such as those herein described are well known to those skilled in the art of fatty acid chemistry. The details of individual preparations are listed in the operating examples which follow:

EXAMPLE 1

*N-oleoyl-2-methylpiperidine.*—A mixture of 31.6 grams (0.32 mole) of 2-methylpiperidine, 60 grams (0.21 mole) of oleic acid, and 20 milliliters of benzene was refluxed in an apparatus equipped with a Dean-Stark trap until the evolution of water ceased. The reaction mixture was diluted with 150 milliliters of commercial hexane, washed successively with dilute hydrochloric acid and water, and dried over anhydrous sodium sulfate. Free acid was removed by percolating the hexane solution through a column of activated alumina, and eluting the amide with a 1:1 hexane-ethanol mixture. The solvent was removed by stripping under reduced pressure. Analysis of the product, N-oleoyl-2-methylpiperidine: percent C, 78.87 (theory 79.20); percent H, 12.13 (theory 12.47); percent N, 3.86 (theory 3.85).

EXAMPLE 2

*N-oleoylpyrrolidine.*—N-oleoylpyrrolidine was prepared by the procedure of Example 3 from 15.1 grams (0.21 mole) of pyrrolyidine and 40 grams (0.14 mole) of oleic acid. Analysis of the product, N-oleoylpyrrolidine: percent C, 77.81 (theory 78.67); percent H, 12.11 (theory 12.32); percent N, 4.30 (theory 4.17).

We claim:
N-oleoylpyrrolidine.

References Cited by the Examiner

FOREIGN PATENTS 327,724   8/1935   Italy.

ALEX MAZEL, *Primary Examiner.*

HENRY R. JILES, *Examiner.*

JOSE TOVAR, *Assistant Examiner.*